US006816496B2

United States Patent
Russell et al.

(10) Patent No.: US 6,816,496 B2
(45) Date of Patent: *Nov. 9, 2004

(54) FRAME BASED DATA TRANSMISSION OVER SYNCHRONOUS DIGITAL HIERARCHY NETWORK

(75) Inventors: John Paul Russell, Sawbridgeworth (GB); Christopher David Murton, Chelmsford (GB); David Michael Goodman, St Albans (GB); Christopher Thomas William Ramsden, Hertford (GB); James Shields, Ottawa (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/233,183

(22) Filed: Aug. 29, 2002

(65) Prior Publication Data

US 2003/0021294 A1 Jan. 30, 2003

Related U.S. Application Data

(62) Division of application No. 09/143,466, filed on Aug. 27, 1998, now Pat. No. 6,496,519.

(51) Int. Cl.[7] .............................................. H04L 12/56
(52) U.S. Cl. ..................................................... 370/408
(58) Field of Search ................................. 370/474, 476, 370/498, 353–356, 466, 907, 914, 916, 442, 464, 395.51, 232, 395.63, 395.44, 401–403, 465

(56) References Cited

U.S. PATENT DOCUMENTS 6,014,708 A * 1/2000 Klish ......................... 709/232
6,584,118 B1 * 6/2003 Russell et al. .............. 370/466

* cited by examiner

Primary Examiner—Wellington Chin
Assistant Examiner—Brenda Pham
(74) Attorney, Agent, or Firm—Barnes & Thornburg, LL (57) ABSTRACT

A frame based data communications network is interfaced to a synchronous digital hierarchy network via a plurality of frame based data port cards incorporated into a plurality of synchronous multiplexers. Each port card comprises a conventional frame based data port, a frame switch, a rate adapter means and a mapping means for mapping data frames into a plurality of SDH virtual containers. Frame based data is incorporated directly into a synchronous virtual container without encapsulation in an intermediate protocol. A number of topologies of a frame based data channel network are possible, overlaid on the underlying synchronous transport network, including an open loop topology, a ring mode topology, and a backhaul topology.

30 Claims, 11 Drawing Sheets

FRAME BASED DATA TRANSMISSION OVER SYNCHRONOUS DIGITAL HIERARCHY NETWORK

RELATED APPLICATION

This application is a division of U.S. patent application Ser. No. 09/143,466, filed Aug. 27, 1998 now U.S. Pat. No. 6,496,519.

FIELD OF THE INVENTION

The present invention relates to the carrying of data frame traffic over a synchronous digital network.

BACKGROUND TO THE INVENTION

Historically, the telecommunications industry has developed separately and largely independently from the computing industry. Conventional telecommunications systems are characterized by having high reliability circuit switched networks for communicating over long distances, whereas data communications between communicating computers is largely based upon shared access packet communications.

Datacoms may operate over a local area, to form a local area network (LAN) or over a wide area to form a wide area network (WAN). Historically the difference between a LAN and a WAN is one of geographical coverage. A LAN may cover communicating computing devices distributed over an area of kilometers or tens of kilometers, whereas a WAN may encompass communicating computing devices distributed over a wider geographical area, of the order of hundreds of kilometers or greater.

Conventional local area networks are generally taken to be digital data networks operating at rates in excess of 1 MBits/s over distances of from a few meters up to several kilometers. Conventional local area networks are almost universally serial systems, in which both data and control functions are carried through the same channel or medium. Local area networks are primarily data transmission systems intended to link computer devices and associated devices within a restricted geographical area. However, many local area networks include speech transmission as a service. A plurality of computer and associated devices linked together in a LAN may range from anything from a full-scale mainframe computing system to small personal computers. Since a local area network is confined to a restricted geographical area, it is possible to employ vastly different transmission methods from those commonly used in telecommunications systems. Local area networks are usually specific to a particular organization which owns them and can be completely independent of the constraints imposed by public telephone authorities, the ITU, and other public services. Local area networks are characterized by comprising inexpensive line driving equipment rather than the relatively complex modems needed for public analogue networks. High data transmission rates are achieved by utilizing the advantages of short distance.

Conventional wide area networks operate in general on a greater scale than local area networks. A wide area network is generally employed whenever information in electronic form on cables leaves a site, even for short distances. Data transmission rates involved are generally between a few hundred and a few thousand bits per second, typically up to 50 kilobits per second. The distances involved in a wide area network are from around 1 kilometer to possible thousands of kilometers, and error rates are greater than with local area networks. Wide area networks are generally carried over public telecommunications networks.

The distinction between networks which have historically been considered to be local area networks and those which have been considered to be wide area networks is becoming increasingly blurred.

Because conventional telecoms systems have developed in parallel with conventional datacoms systems, there is a significant mis-match in data rates between conventional datacoms protocols as used in LANs and WANs, and conventional telecoms protocols. In general, telecoms operators provide equipment having standard telecoms interfaces, for example E1, T1, E3, T3, STM-1, which are used by the datacoms industry to provide wide area network point to point links. However, this is inconvenient for datacoms providers since datacoms protocols have developed using a completely different set of interfaces and protocols, for example carrier sense multiple access collision detection CSMA/CD systems, subject of IEEE standard 802.3, and Ethernet which is available in 10 MBits/s, 100 MBits/s and 1 GigaBits/s versions. Conventional datacoms protocols do not match up very well to conventional telecoms interfaces because of a mis-match in data rates and technologies between conventional datacoms and conventional telecoms.

Several prior art attempts have been made to carry frame based data over telecoms networks. Prior art systems for incorporating frame based data over synchronous networks include schemes which contain Ethernet data frames in asynchronous transfer mode (ATM) cells which are then transported in a plesioscynchronous mode and which may then be transported according to ITU-T recommendation G.708 in a synchronous digital hierarchy (SDH) network. In this scheme, known as IMA (Inverse multiplexing of ATM), conceived by the ATM Forum, an ATM circuit is divided and input into a plurality of E1 circuits. This enables an ATM signal to be carried across a legacy network, for example a plesiosynchronous digital hierarchy (PDH) network. Ethernet frames are included as the payload of the ATM cells, which are then carried via the E1 circuits over a conventional PDH network. However, this prior art scheme has a disadvantage of a high packetization header overhead, which can comprise up to 20% of the SDH payload.

Another prior art system aimed at carrying frame based data over synchronous digital networks is the conventional Ethernet remote bridge. This system is based on the known PPP protocol, for example, as implemented by the packet on Sonet (POS phy) system of PMC Sierra. However, in this scheme, a high packetization overhead is present and packaging delays are relatively high.

Manufacturers such as CISCO, and Bay Networks produce equipment for both of the above mentioned inverse multiplexing of ATM, and Ethernet bridge systems.

A further prior art scheme uses a plurality of fiber optic repeaters to provide native Ethernet rate connections between a customer premises and a LAN switch. However, this solution dedicates a whole fiber to Ethernet rate, which is an inefficient use of the fiber optic cable resources.

SUMMARY OF THE INVENTION

One object of the present invention is to provide high data rate, high reliability functionality available with conventional local area networks, but over a wide area network transported on a long distance high capacity synchronous digital network.

Another object of the present invention is to overcome data rate mis-matched between conventional datacoms systems and conventional telecommunications systems in an efficient manner.

Another object of the present invention is to incorporate frame based data directly into a synchronous digital hierarchy payload, without encapsulation in an ATM cell or other intermediate carrier.

Another object of the present invention is to incorporate frame based data into a synchronous network without incurring high processing delays, and without incurring a high packetization header overhead.

According to one aspect of the present invention, there is provided a frame based data communications network comprising:

a plurality of computer devices each having a frame based data channel interface;

a plurality of synchronous multiplexers, each having a frame based data channel interface and a synchronous digital communications port, and capable of interfacing between a frame based data protocol and a synchronous digital network protocol;

wherein said plurality of computing devices communicate with each other over a plurality of frame based data channels, said frame based data channels carried over a synchronous digital transport network connecting said plurality of synchronous multiplexers.

Preferably, said frame based channel interface interfaces directly between said frame based data protocol and said synchronous digital network protocol without traversing any intermediate protocols.

Preferably, said frame based data channel interface comprises: means for mapping a data frame of said frame based data channel to at least one payload of said synchronous network protocol.

The synchronous digital transport network may comprise a synchronous digital hierarchy (SDH) network in accordance with ITU-T G70.X, an example of which is the synchronous optical network (SONET) in accordance with ITU-T recommendation G.708 and related recommendations.

Synchronous multiplexers may comprise add-drop multiplexers, or terminal multiplexers.

According to a second aspect of the present invention, there is provided a synchronous digital multiplexer comprising:

a plurality of telecoms tributary interfaces;

a frame based data channel interface; and a synchronous digital channel port.

By providing a plurality of telecoms tributaries in addition to a frame based data access port in a synchronous multiplexer, frame based data channels may be entered directly into synchronous digital hierarchy virtual container payloads in an efficient manner.

Preferably said frame based channel interface comprises:

a frame based data channel physical port;

a frame based data channel switch communicating with said frame based data channel physical port;

a rate adaption means for converting data at a frame based data channel rate into a bitstream of a data rate capable of being carried in at least one virtual container; and a synchronous digital network payload mapper for mapping said bitstream into said at least one virtual container.

According to a third aspect of the present invention there is provided a method of communicating frame based data over a synchronous digital network comprising the steps of:

modifying a data rate of said frame based data to a rate compatible with a synchronous digital network virtual container; and inputting said rate adapted frame based data directly into at least one said synchronous digital network virtual container.

Preferably said method comprises the steps of:

concatenating a plurality of said virtual containers together; and containing a said data frame into said plurality of concatenated virtual containers.

The invention includes a method of creating a frame based data channel within a synchronous digital channel comprising the steps of:

modifying a data rate of said frame based data outside said synchronous digital channel to a rate compatible with said synchronous digital channel; and mapping said rate adapted frame based data directly to said synchronous digital channel.

Said step of mapping preferably comprises containing said modified data frame based data into at least one virtual container.

The invention includes a communications network comprising:

a plurality of network components supporting an OSI layer 2 frame based data channel;

a plurality of network components supporting at least one synchronous digital channel; and a plurality of network components capable of transferring data frames of said OSI layer 2 data channel directly into and out of a plurality of payloads of said at least one synchronous digital channel.

The invention includes a data communications network comprising:

a plurality of network devices each comprising: an OSI layer 2 frame switching device; a rate adaption device for adapting a data rate between an OSI layer 2 data rate and a synchronous transmission data rate; and a mapping device for mapping data between said OSI layer 2 frame switch and a synchronous digital channel;

wherein said plurality of mapping devices communicate over said synchronous digital channel; and said plurality of OSI layer 2 frame switching devices communicate over an OSI layer 2 channel carried on said synchronous digital network.

Said OSI layer 2 channel may comprise a ring channel linking said plurality of network devices.

Said OSI layer 2 channel may comprise a plurality of point to point channels linking pairs of individual said OSI layer 2 frame switches.

The invention includes a communications network comprising:

a plurality of network devices each comprising: a rate adaption device for adapting a data rate between an OSI layer 2 data rate and a synchronous transmission data rate; and a mapping device for mapping data between an OSI layer 2 channel and a synchronous digital channel;

wherein said plurality of mapping means communicate over said synchronous digital channel; and said plurality of rate adaption means communicate over said OSI layer 2 channel carried on said synchronous digital channel.

Said OSI layer 2 channel may comprise a ring channel.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
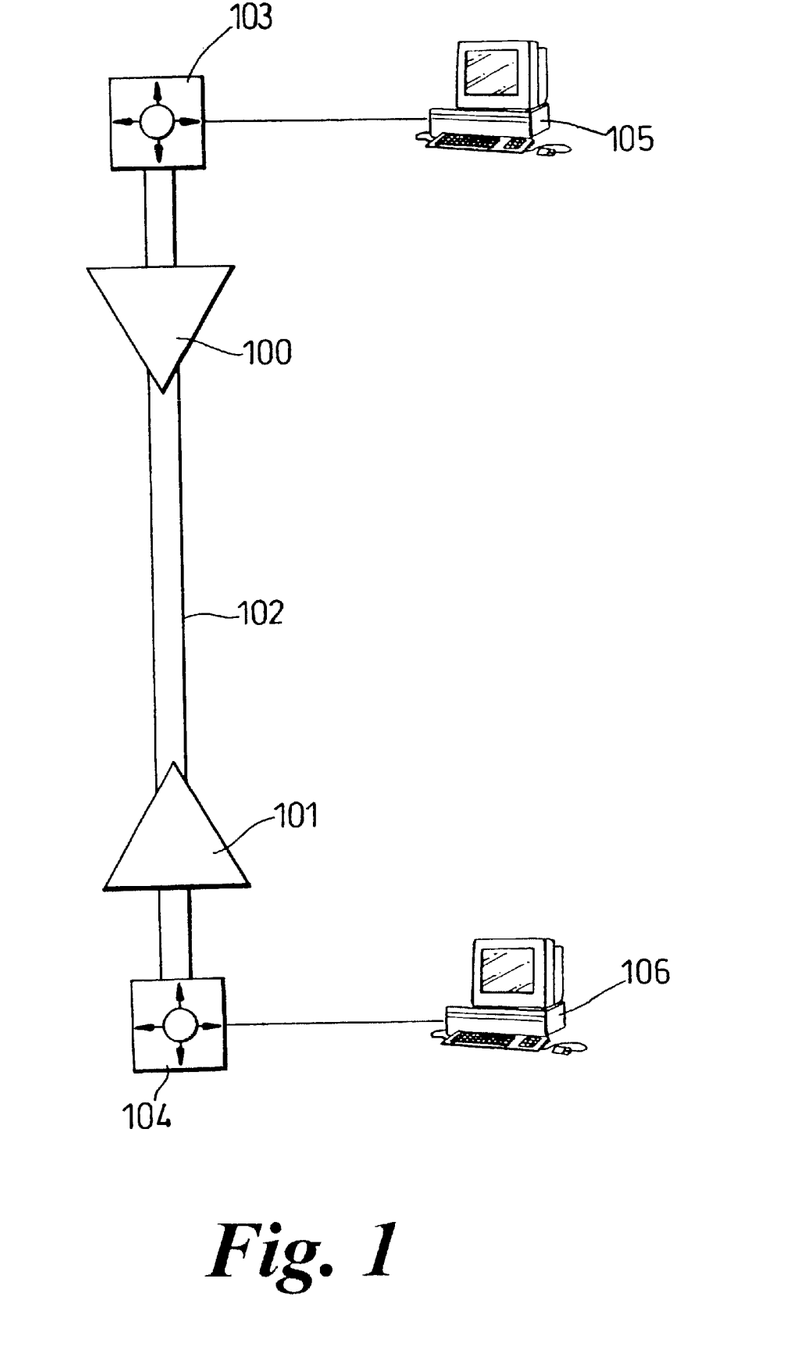
FIG. 1 illustrates schematically elements of a first embodiment data network carrying a frame based data channel over a synchronous data channel.

Referring to FIG. 1 herein, there is illustrated schematically elements of a first embodiment data network according to the present invention. A frame based data communications system carried over a synchronous digital network is provided by the arrangement shown in FIG. 1. In this specification, the terms synchronous network and synchronous digital network are used to refer to a time division multiplexed synchronous transport layer in OSI layer 1. Conventional examples of such networks include the synchronous digital hierarchy (SDH) of ITU-T recommendation G70.X, which incorporates synchronous optical network (SONET) systems specified in ITU-T recommendation G.709 and related recommendations. The data network elements comprise first and second synchronous digital terminal multiplexers, 100, 101 connected to each other by an optical fiber communications link 102; a first datacoms router 103 communicating with first terminal multiplexer 100; a second datacoms router 104 communicating with second terminal multiplexer 101; a first computer device 105 communicating with first datacoms router 100; and a second computer device communicating with second datacoms router 104. Each of first and second computer devices 105, 106, first and second routers 103, 104 and first and second terminal multiplexers 100, 101 comprise a frame based data channel interface. First and second computer devices communicate frame based data with each other over the routers and over the optical fiber communications link. Communication between first and second multiplexers 100, 101 is via a synchronous digital network protocol, for example the synchronous digital hierarchy protocol (SDH) or synchronous optical network protocol (SONET) as specified in ITU-T recommendation G.709 and related recommendations. Communication between the computing devices 105 and 106 and the respective datacoms routers 103, 104 is by conventional data frame based data communications protocol.

In this specification, the term frame based data communications protocol or system is used to refer to any data communications system or protocol in which blocks of data are assembled within OSI layer 2. Both traffic data and control data may be contained within the OSI layer 2 frame. Frames in OSI layer 2 systems may comprise packets or blocks of data bytes of variable length. Examples of conventional frame based data communications protocols include IEEE standard 802.3 CSMA/CD local area network systems, Ethernet systems, conventional token ring systems, conventional token bus systems, conventional fiber distributed data interface FDDI systems and conventional dual queue dual bus (DQDB) systems.

Communication between first and second routers 103, 104 and respective first and second terminal multiplexers 100, 101 is by a frame based data technology as will be understood by those skilled in the art. First and second terminal multiplexers 100, 101 may be separated geographically by distances from the order of a few meters to thousands of kilometers. The arrangement shown in FIG. 1 is a simplified arrangement, and in practice many computer devices, many routers and many multiplexers will be interconnected to form an integrated frame based data communications system carried over a synchronous digital network.

As mentioned hereinbefore, a problem with transporting data contained in conventional datacoms frame based data systems over conventional synchronous digital telecoms transport systems is that there is a mis-match of data rates between the datacoms domain and the telecommunications domain.

Therefore, for communication of datacoms systems data at first and second routers 103, 104 with first and second terminal multiplexers 100, 101 efficient conversion between the frame based data datacoms system and the synchronous digital network protocols needs to be achieved.

Hereinafter, specific methods and embodiments according to a best mode herein will be described specific to synchronous digital hierarchy telecommunications systems in accordance with ITU recommendation G.709, and an IEEE standard 802.3 frame based data carrier system, a representative example of which is the Ethernet system. However, the general principles, methods and apparatus according to the present invention encompass synchronous digital networks in general, and OSI layer 2 frame based data carrier systems in general, and are not restricted to the specific examples of synchronous digital hierarchy networks or Ethernet networks.

Figure 2:
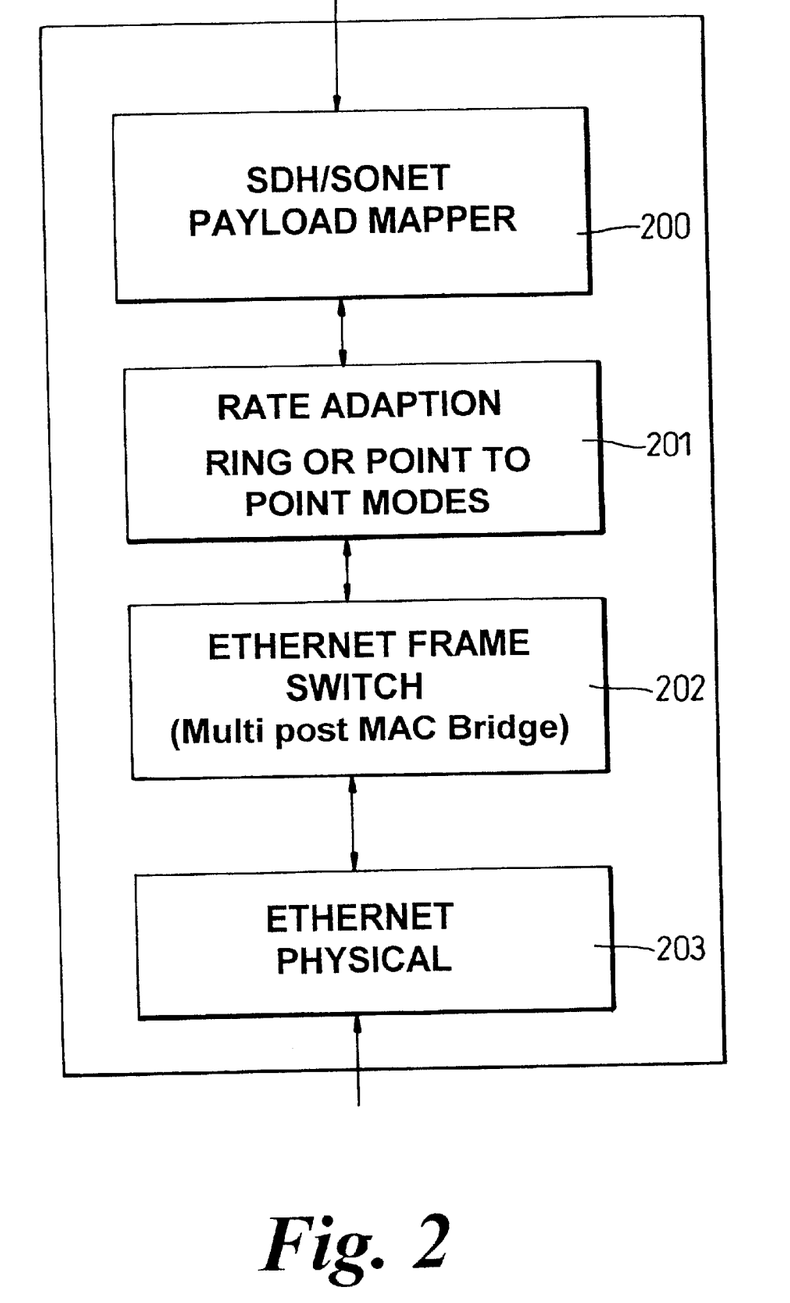
FIG. 2 illustrates schematically a frame based data channel port component of a synchronous digital multiplexer according to a first embodiment of the present invention.

Referring to FIG. 2 herein, there is illustrated schematically components of an Ethernet port card comprising a synchronous digital multiplexer. The Ethernet port card is incorporated into a synchronous digital hierarchy multiplexer (or a SONET mulitplexer), so that as well as having a plurality of tributary interfaces for telecoms channels, for example E1, T1, E3, T3, STM-1, the multiplexer also has an interface for frame based data systems, eg Ethernet.

Figure 3:
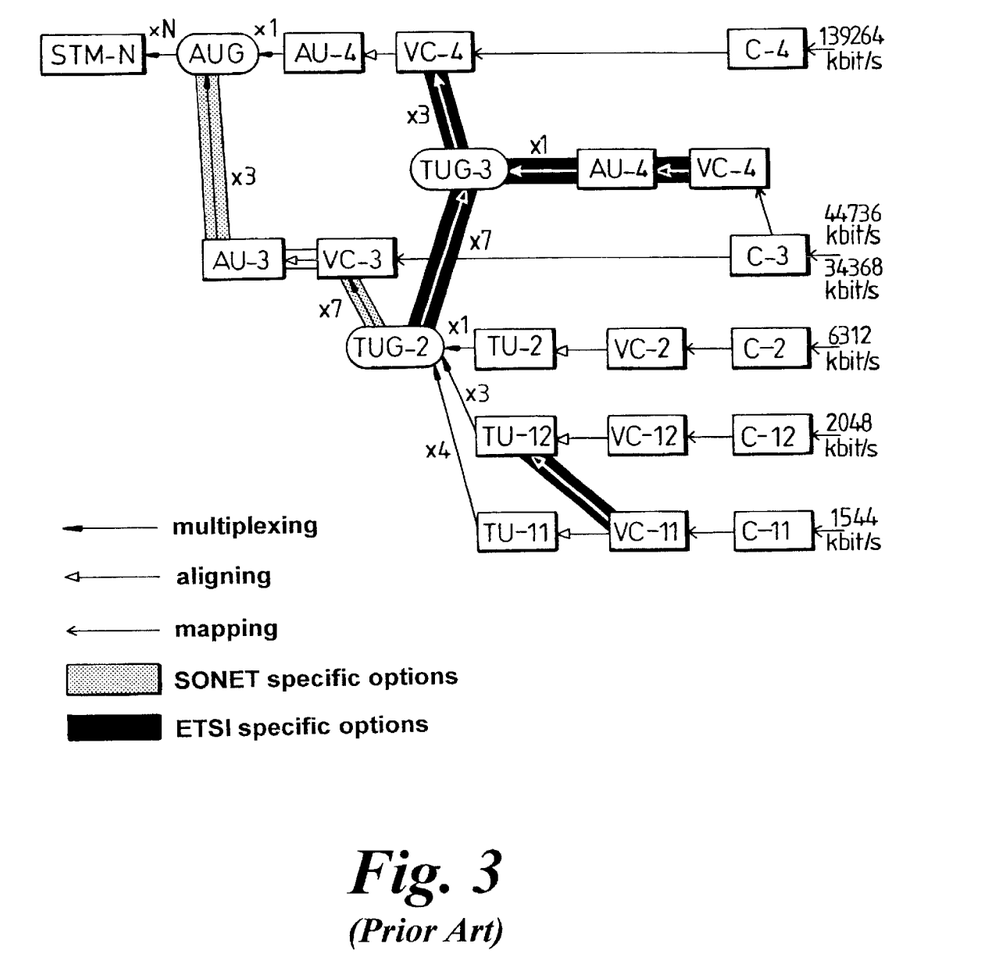
FIG. 3 illustrates schematically a prior art synchronous digital hierarchy multiplexing structure.
Figure 4:
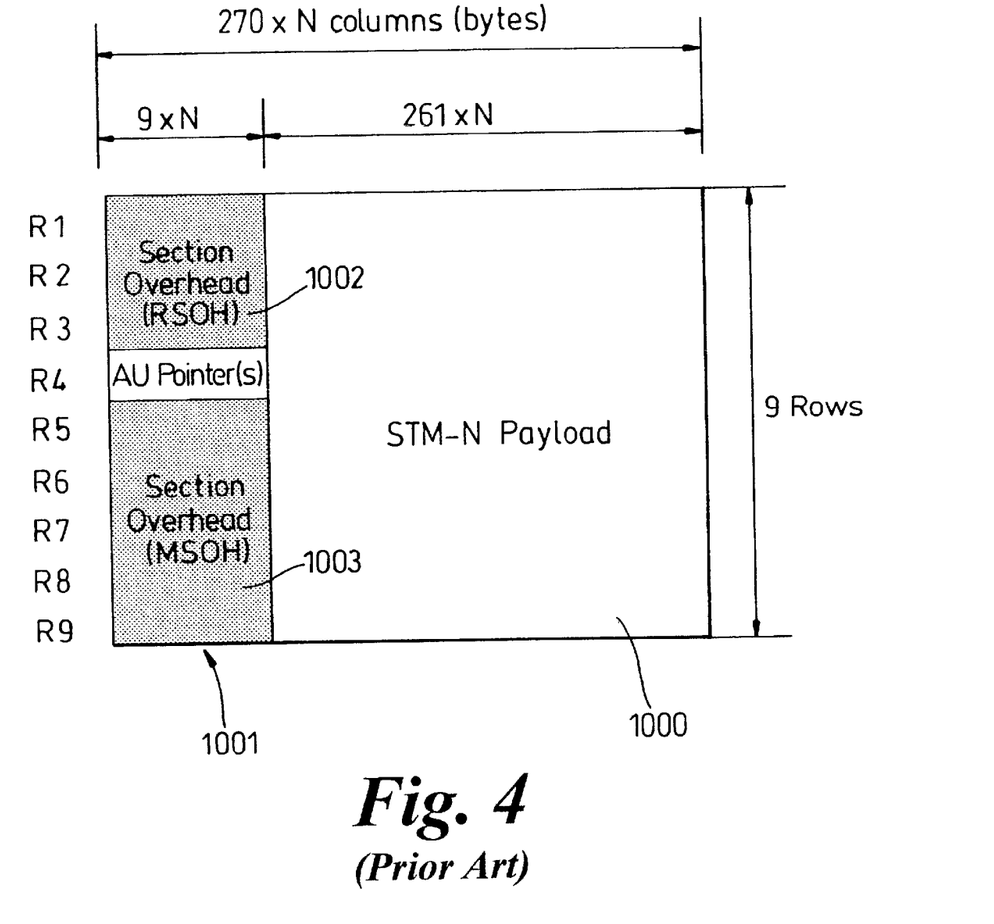
FIG. 4 illustrates schematically a synchronous digital hierarchy; STM frame and payload.

Fundamentally, SDH multiplexers operate to time division multiplex bit oriented data. A plurality of lower data rate telecoms tributaries are multiplexed into a set of virtual containers operating at higher data rates. The SDH multiplexing structure according to ITU-T recommendation G.70X is illustrated schematically in FIG. 3 herein. A set of STM frames are assembled to contain a plurality of virtual containers which are carried as an STM payload as illustrated in FIG. 4 herein. On the other hand, conventional datacoms routers and equipment are frame oriented devices which operate on packets of data. The Ethernet port card adapts the Ethernet data frames to a rate which matches a rate which can be multiplexed into a virtual container, and maps each Ethernet data frame into one or more SDH virtual containers directly without any further encapsulation in intermediate protocols.

For example, a 10 MBits/s Ethernet channel may be mapped onto 5 VC12 containers, each VC12 container having a rate of 2.048 MBits/s. The 5 VC12 containers are concatenated together to carry the 10 MBits/s Ethernet channel.

For entry of a 100 MBits/s Ethernet channel into the synchronous network, a single 100 MBits/s Ethernet channel may be mapped into 2 concatenated VC3 containers each having a capacity of 51.84 10 MBits/s to carry an Ethernet 1 GBits/s channel over a synchronous network, the Ethernet channel is mapped into 7 VC4 containers, each having a capacity of 139 MBits/s.

The Ethernet port card of FIG. 2 herein comprises a conventional Ethernet physical port 201, the Ethernet physical port communicating with an Ethernet frame switch 202 which may comprise a conventional frame switch, such as available from Plaintree, MMC, or TI; a rate adaption means 203 for adapting between Ethernet rates and SDH rates equivalent to the rates of the virtual containers; and an SDH payload mapper 204 for mapping Ethernet frames into one or more SDH payloads. Rate adaption means 203 and SDH payload mapper 204 may be implemented as a field programmable gate array (FPGA) or an application specific integrated circuit (ASIC).

Operation of SDH payload mapper 204 is disclosed in the applicant's co-pending U.S. patent application entitled "Payload Mapping in SDH Networks", a copy of which is filed herewith. Data frames are mapped directly into SDH virtual containers for transport across an SDH network without adapting through any intermediate protocols.

Rate adaption means 203 comprises a first plurality of Ethernet ports operating at 10 MBits/s; and 100 MBits/s in accordance with IEEE standard 802.3; and a second plurality of ports operating at 2 MBits/s, 50 MBits/s and 100 MBits/s communicating with SDH payload mapper 204. Rate adaption means 203 comprises a plurality of through channels for adapting IEEE standard 802.3 data frames into bitstreams having data rates of 2 MBits/s, 50 MBits/s and 100 MBits/s. Rate adaption means 203 comprises a plurality of multiple channels each adapting an IEEE standard 802.3 rate data frame channel to a 2 MBits/s, 50 MBits/s or 100 MBits/s bitstream channel. Rate adaption means 203 operates effectively as a packet buffer, since Ethernet Data Frames issue from the Ethernet frame switches at a higher rate than they can be multiplexed into SDH virtual containers. Rate adaption means 203 inputs Ethernet data frames from Ethernet frame switches 202 faster than it outputs the Ethernet data frames into the SDH virtual containers. Ethernet data frames are stored in rate adaption means 203. If the buffer stores within rate adaption means 203 become overloaded, the rate adaption means initiates flow control by sending signals back to the Ethernet frame switch to delay sending a further Ethernet frame until the buffer in the rate adaption means has sufficient capacity to accept new Ethernet data frames.

In a further embodiment, rate adaption means 203 may be replaced by prior art commercially available POS phy chips available from PMC Sierra.

SDH payload mapper 204 communicates with the plurality of bitstream channels of rate adaption encapsulater 203. SDH payload mapper maps the plurality of bitstream channels of rate adaption means 302 into a plurality of SDH payloads, for example VC3, VC4 or VC12 thereby accessing the synchronous digital hierarchy network.

Provision of a frame data port in a synchronous digital multiplexer enables a number of methods of interconnecting a frame data channel over a synchronous digital channel as will now be described.

Figure 5:
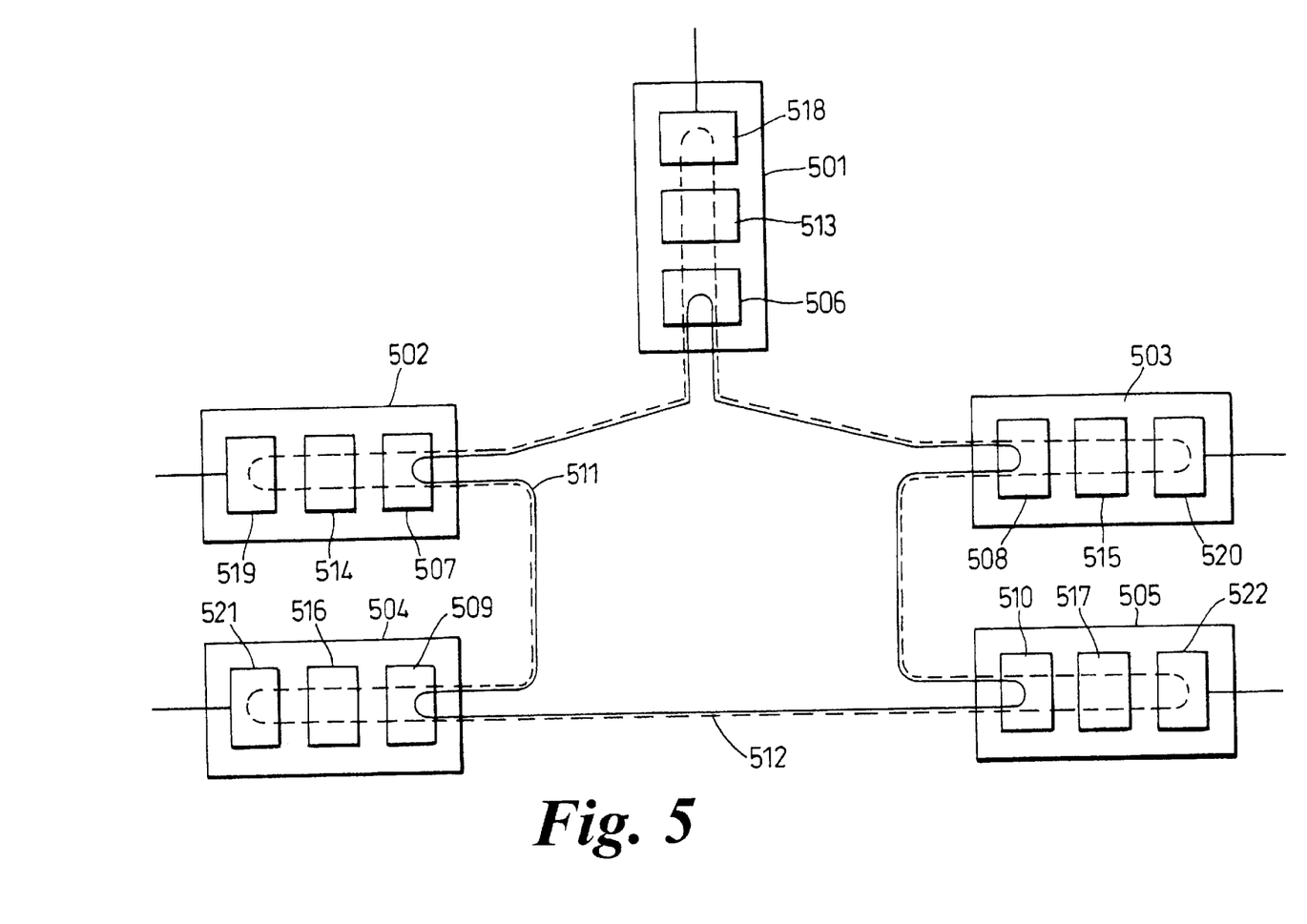
FIG. 5 illustrates schematically a plurality of synchronous digital multiplexers connected together by means of a plurality of frame based data ports, supporting an Ethernet tandem switching mode channel carried on a synchronous digital loop.

Referring to FIG. 5 herein, there is illustrated a first interconnection scheme of a plurality of multiplexers in a synchronous digital hierarchy network for connecting multiplexers in a tandem mode. First to fifth line cards 501–505 each comprise a SDH payload mapper, a rate adaption means, an Ethernet frame switch and an Ethernet physical port as described hereinbefore. An SDH payload mapper of each card 506–510 respectively are connected together in a synchronous channel 511, shown as a solid line in FIG. 5. The SDH ring may comprise a VC12, VC3 or VC4 containment. The synchronous channel carries an Ethernet channel 512, shown as a dotted line in FIG. 5 carrying frame based data, the Ethernet channel extending within each card through the SDH payload mapper, through the rate adaption means 513–517, and into the Ethernet frame switch 518–522 respectively of each card.

In this method, Ethernet switching is achieved at frame switches 518–522. Rate adaption occurs within the Ethernet ring at Ethernet data rates, as the Ethernet data frames enter into and out of the SDH ring 511 over which they are carried. Ethernet frames are effectively carried over a carrier sense multiple access ring node (CSMA-RN), over a synchronous digital channel 511.

Figure 6:
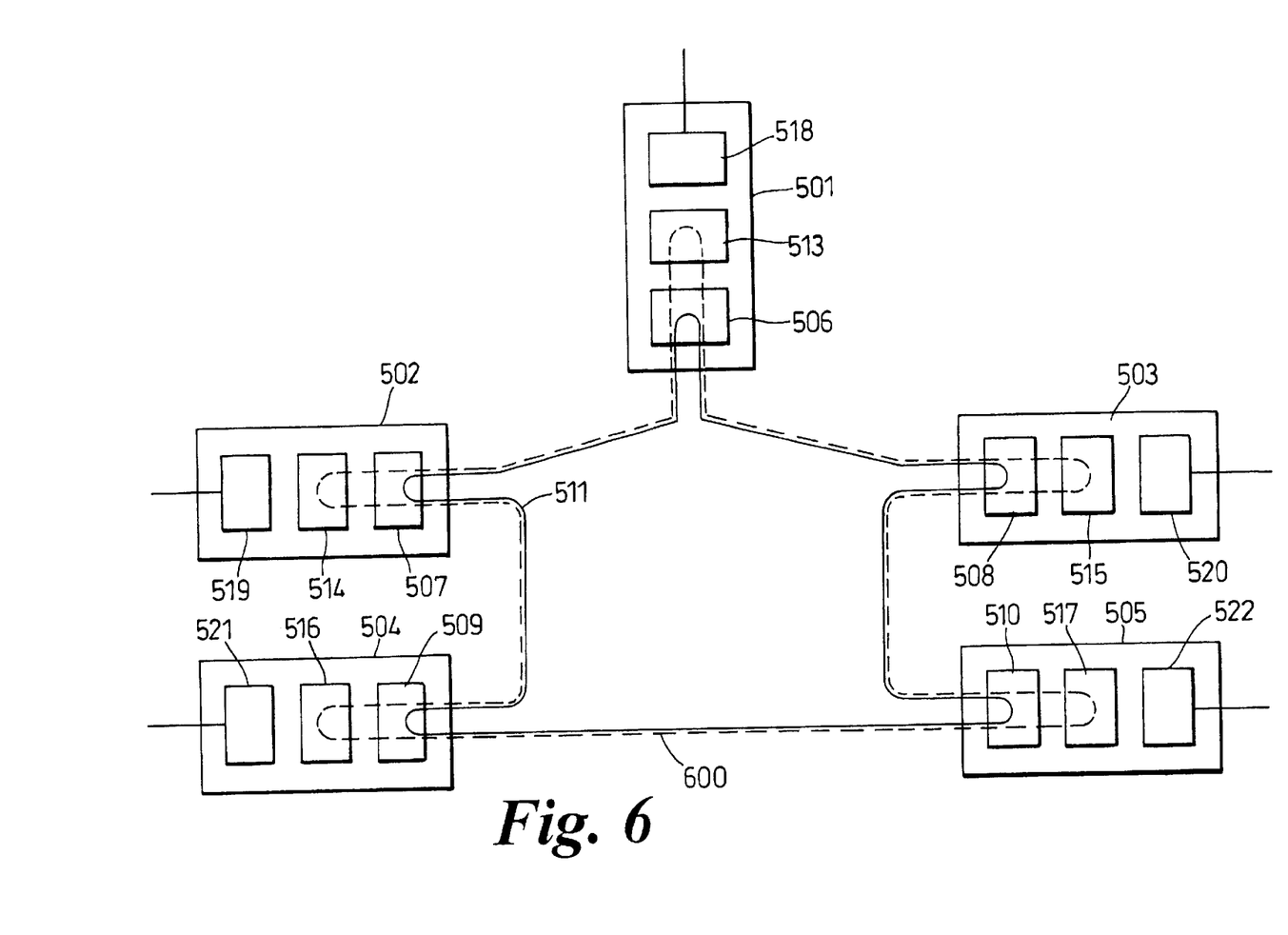
FIG. 6 herein illustrates a plurality of synchronous digital multiplexers, each having a frame based data port, supporting an Ethernet ring carried on an underlying synchronous digital loop.

Referring to FIG. 6 herein, there is illustrated a ring mode of operation between a plurality of Ethernet port cards of a plurality of synchronous digital hierarchy multiplexers. Similarly, as with FIG. 5, each Ethernet port card 501–505 is connected via its corresponding SDH mapper to form a synchronous network. An Ethernet channel 600 is connected in a ring mode between the rate adaption means of each Ethernet port card 513–517 respectively. The Ethernet ring channel does not enter the Ethernet switches 518–522, but is transported through the respective rate adapters 513–517 of the port cards. This may provide an advantage of reducing delays in the Ethernet ring by avoiding rate adaption delays, and passage through the Ethernet switches, and improve scalability of the ring. Further, fast protection of the ring under conditions of ring failure may be achieved. The Ethernet ring may provide a low delay, high output Ethernet communications channel.

Figure 7:
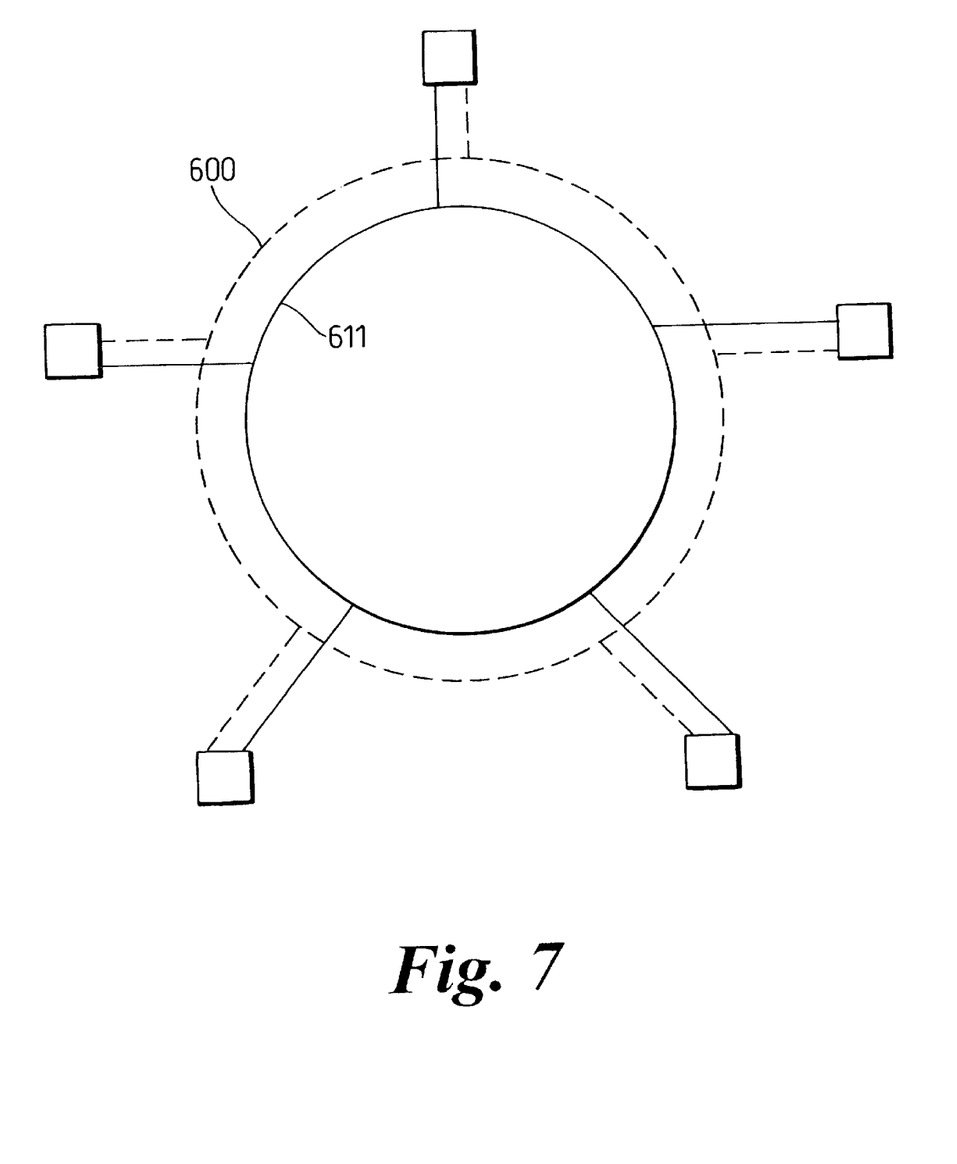
FIG. 7 illustrates schematically a logical view of the Ethernet ring and synchronous digital loop of FIG. 6.

Referring to FIG. 7 herein there is illustrated schematically in logical view the ring mode connections of FIG. 6 herein. Data flow through the rate adaptation components provides dual ring carrier sense multiple access rings.

Figure 8:
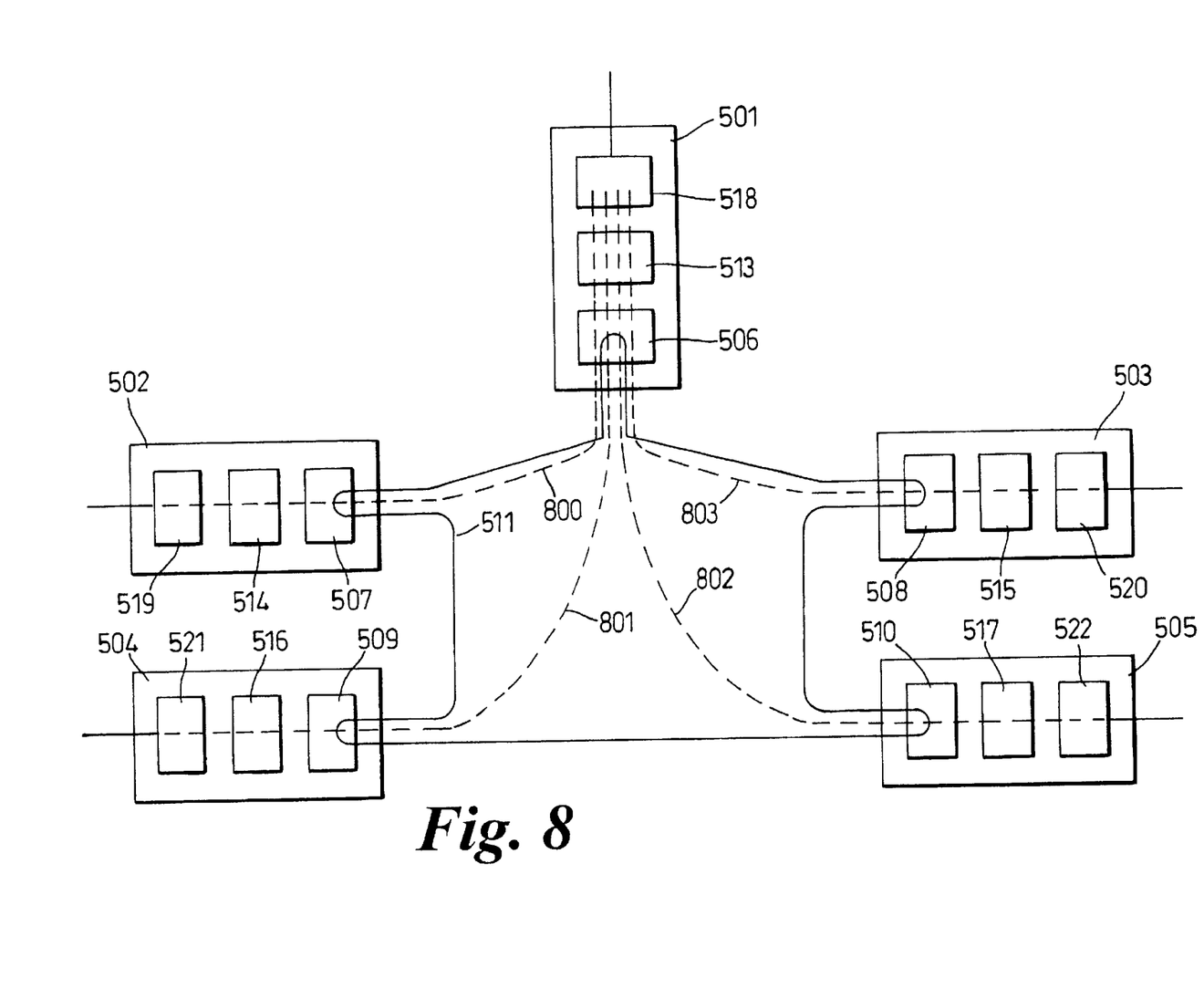
FIG. 8 illustrates schematically a plurality of synchronous digital multiplexers each having a frame based data port, supporting a plurality of point to point Ethernet channels in a backhaul mode of connection, carried over a synchronous digital loop.

Referring to FIG. 8 herein, there is illustrated a third, backhaul, connection scheme for connection of Ethernet channels over a synchronous digital hierarchy network between a plurality of SDH multiplexers. In the backhaul connection mode of FIG. 8, instead of using an OSI layer 2 scheme as illustrated in FIGS. 5, 6 and 7 herein, Ethernet channels are carried over a physical tree of virtual container paths carried over the SDH ring 511. A plurality of Ethernet channels 800–803 are carried over the SDH ring 511. In FIG. 8, the Ethernet channels are shown schematically by their logical connections to the plurality of Ethernet ports 501, 505, although physically transport is over the same physical resources, within the SDH network. A plurality of Ethernet channels arranged in the tree arrangement are physically carried as virtual containers over an SDH ring 511. As with the channel arrangement of FIGS. 5, 6 and 7, ring protection may be applied to the arrangement of FIG. 8. Each Ethernet channel is connected between a pair of Ethernet frame switches, and undergoes rate adaption for entry and exit to the SDH ring.

The three modes of operation presented herein in FIGS. 5 to 8 herein, may be integrated within conventional synchronous digital hierarchy networks, using the Ethernet port cards as entry and exit ports for Ethernet channels in various combinations within an SDH network. Some examples of usage of an Ethernet channel within a synchronous network are described herein with reference to FIGS. 9 to 12.

Figure 9:
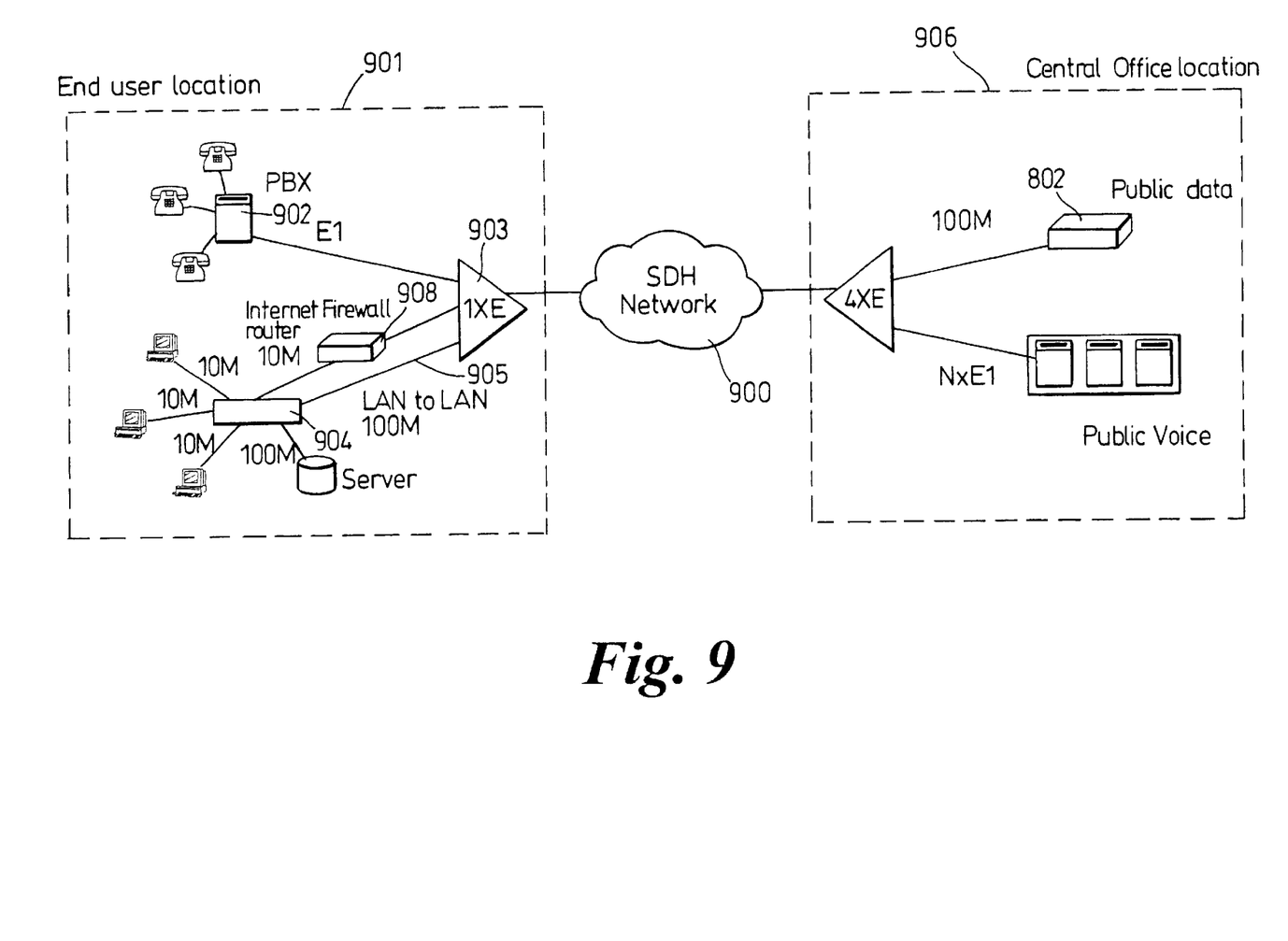
FIG. 9 herein illustrates a first example of a deployment of a frame based data channel over a synchronous digital hierarchy network.

Referring to FIG. 9 herein, using the basic architecture illustrated with reference to FIG. 1 in an overall telecoms system, based on a synchronous digital network 900 voice and data services may be provided in a synchronous digital multiplexer by integrating both conventional telecoms channels, for example E1, and frame based data channels, for example Ethernet. In the example shown in FIG. 9, at an end user location 901, a PBX 902 may communicate with a synchronous terminal multiplexer 903 in conventional manner and an Ethernet switch 904 may communicate directly with the synchronous multiplexer via, for example a 100 MBits/s link 905 to provide a private frame based data network via a central office location 906 supporting a public frame data channel signified by router 907. Similarly, Ethernet switch 904 may access a public data frame network via a firewall router 908.

Figure 10:
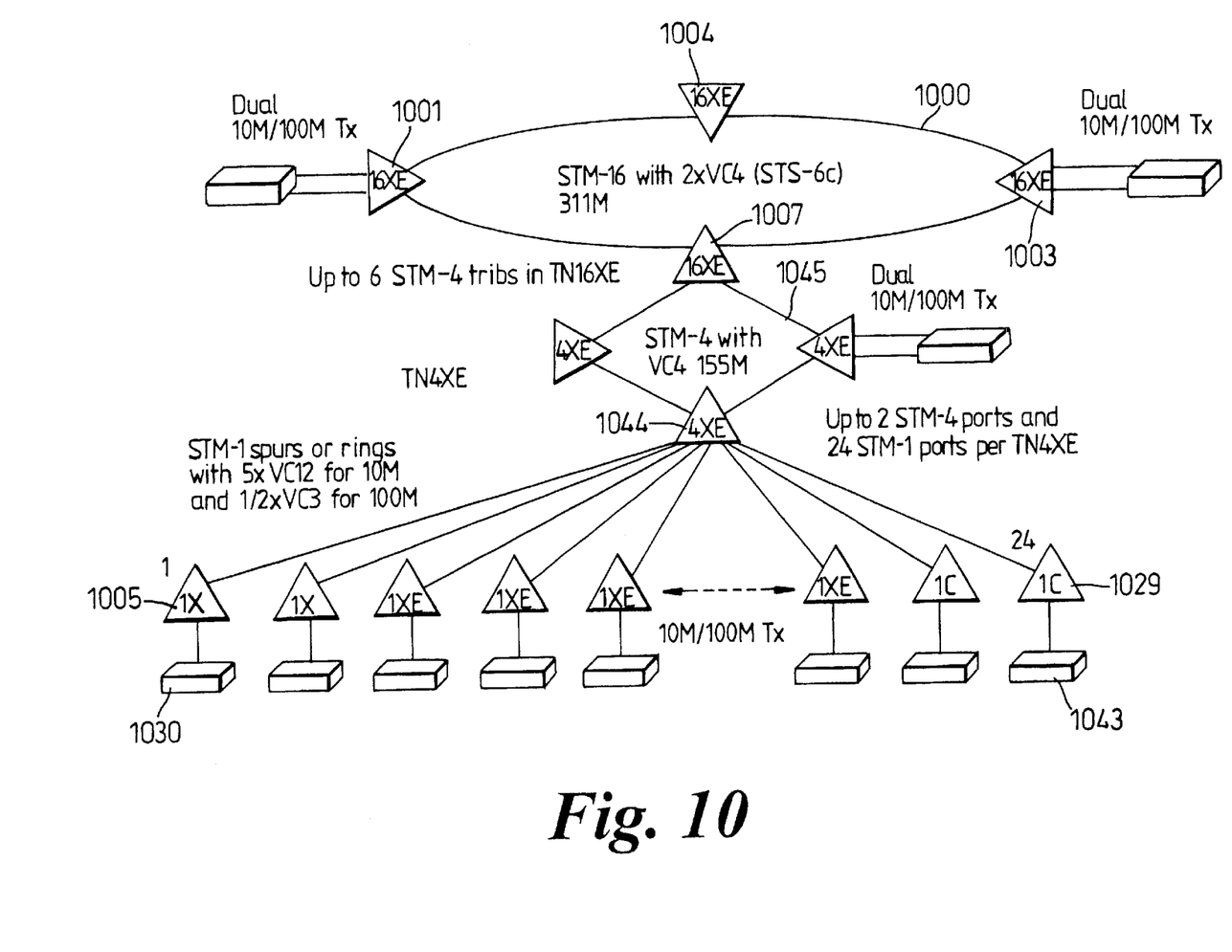
FIG. 10 illustrates schematically a second example of deployment of frame based data channels over a synchronous digital hierarchy network.

Referring to FIG. 10 herein, there is illustrated schematically how a combination of the connectivity schemes described in relation to FIGS. 5 to 8 herein may operate in a new synchronous digital hierarchy network.

The example synchronous network of FIG. 10 comprises an STM-16 ring 1000 accessible through a plurality of add-drop multiplexers 1001–1004. A plurality of terminal multiplexers 1005–1029 may be provided, one per customer premises equipment. At each customer premises equipment, access to the synchronous network is made via a corresponding Ethernet port card in the synchronous multiplexer, which is connected to a corresponding respective Ethernet router 1030–1043. The plurality of terminal multiplexers may be connected synchronously to an intermediate multiplexer 1044 forming part of a sub-ring 1045. Connection between the intermediate multiplexer 1044 and the plurality of tributary multiplexers 1005–1029 may take the backhaul form as illustrated with reference to FIG. 8 herein, in which a plurality of Ethernet channels are carried over a synchronous ring. In the lower part of FIG. 10 herein, the plurality of Ethernet channels are shown logically as radiating from intermediate multiplexer 1044 to the plurality of terminal multiplexers 1005–1029. Within sub-ring 1045, the tandem switching mode, or the ring mode as described with reference to FIGS. 5 to 8 herein may operate.

Figure 11:
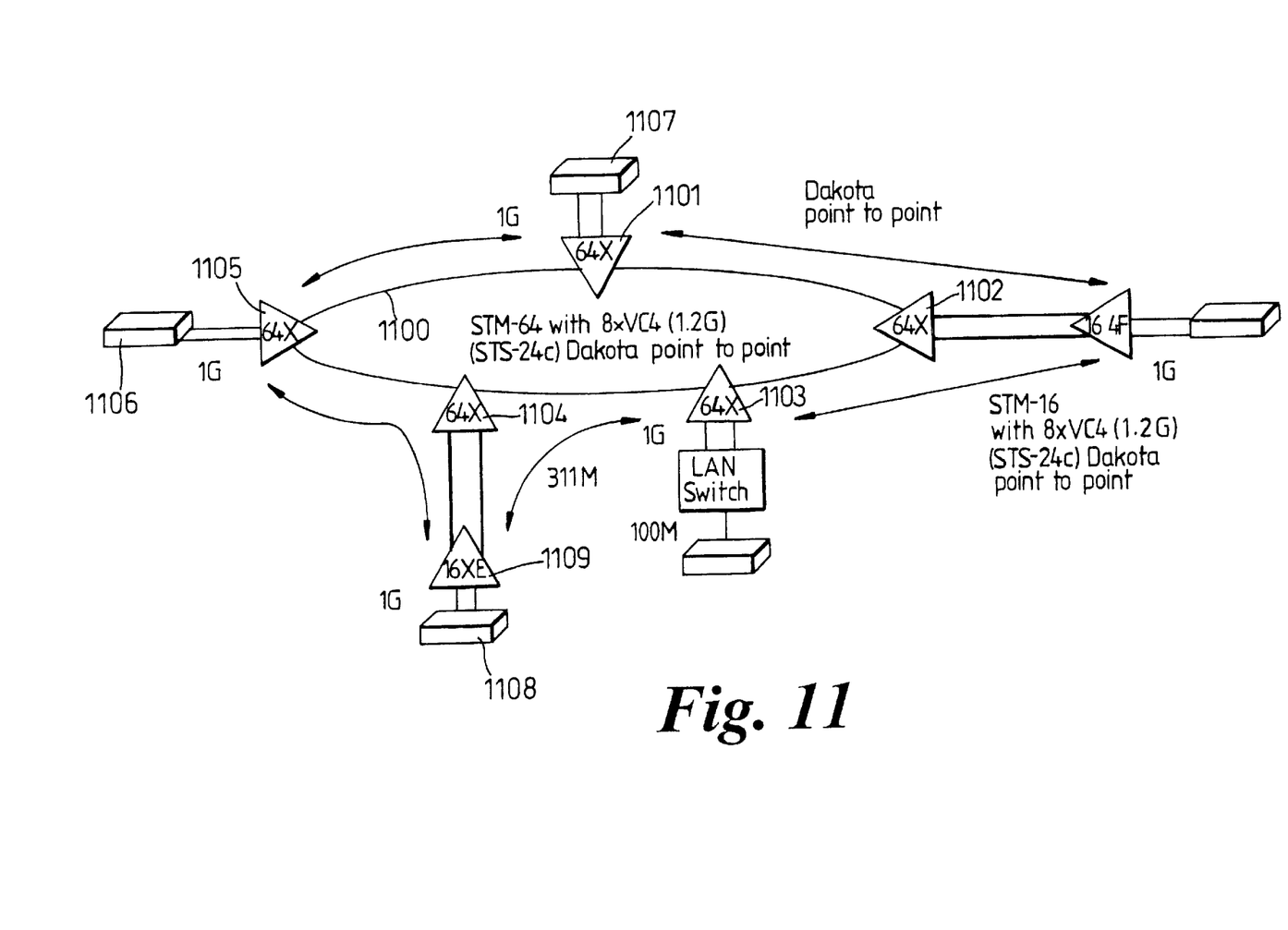
FIG. 11 illustrates schematically a third example of deployment of a plurality of frame based data channels over a synchronous digital hierarchy network.

Referring to FIG. 11 herein, there is illustrated schematically a second network layout incorporating a plurality of Ethernet frame based data channels transported across an underlying synchronous digital hierarchy network. An STM-64 synchronous ring 1100 links a plurality of add-drop multiplexers 1101–1105 in a synchronous loop. Various Ethernet frame based data channels may be transported over the underlying synchronous network as follows. In this example, a further Ethernet channel between first Ethernet router 1106 and second Ethernet router 1107 is carried over STM-64 ring 1100 between first and second add-drop multiplexers 1101, 1105, each of which are equipped with an Ethernet port as described hereinbefore. A second Ethernet channel between first Ethernet router 1106 and third Ethernet router 1108 of 1 Gbit/s is carried between a terminal multiplexer 1109 equipped with an Ethernet port as described hereinbefore, and an add-drop multiplexer 1104, for access to the STM-64 ring 1100.

The specific embodiments and specific methods disclosed herein may enable the following advantages:

Firstly, compared to the prior art systems which interface Ethernet through a conventional telecoms interface, e.g. E1, T1, by dispensing with the telecoms interface, by use of the Ethernet port card as described hereinbefore, an equipment cost saving may achieved, because there is no need for adaption of Ethernet data into a telecoms interface, eg E1 or T1.

Secondly, port consolidation may be achieved. Instead of having a large number of ports at a head end, as in prior art systems, one frame based data port per multiplexer may be provided. A saving on equipment and wiring may be achieved.

Further, efficient utilization of channel capacity may be achieved in the synchronous network, through application of statistical gain between the frame based data rate channels and the synchronous data rate channels. For example, since frame based data channels are not always fully utilized, a plurality of frame based data rate channels may be multiplexed onto a synchronous rate channel of a same or similar data rate. For example, four 10 MBits/s data frame rate channels may be multiplexed onto a single 10 MBits/s synchronous rate channel, since the total traffic received from the four frame based data rate channels, which are not all fully utilized at the same time, may be statistically multiplexed onto a single 10 MBits/s synchronous data rate channel.

Further, since the SDH virtual container payload data rates are relatively flexible, compared to conventional telecoms interface data rates, a more efficient match between Ethernet frame based data, operating at Ethernet data rates, and telecoms data rates in the synchronous domain can be achieved compared with E1, E3, STM-1 and STM-4 data rates. Table 1 herein illustrates a comparison of Ethernet data rates (in a central column of Table 1) with telecoms interface rates (in the left hand column of FIG. 1), and SDH virtual container rates (in the right hand column of Table 1). For example, a 10 MBits/s Ethernet data rate can be accommodated neatly into 5 VC12 containers, each of 2 MBits/s. A 100 MBits/s Ethernet data rate can be accommodated in 2 VC3 containers, each of 50 MBits/s.

TABLE 1

| Telecoms | Ethernet | Synchronous Network |
|---|---|---|
| E1 (2 Mbits/s) | 10 MBits/s | 1-5xVC12 (2 MBits/s–10 MBits/s) |
| T1 (1.5 Mbits/s) | 10 MBits/s | 1-8xVT 1.5 (2 MBits/s–10 MBits/s) |
| E3 (34 MBits/s) | 100 MBits/s | 1-2xVC3 (50 MBits/s–100 MBits/s) |
| T3 (45 MBits/s) | 100 MBits/s | 1-2xSTS-1 (50 MBits/s–100 MBits/s) |
| STM-1 (155 MBits/s) | 100 MBits/s | 1-2xVC3 (50 MBits/s–100 MBits/s) |
| OC-3 (155 MBits/s) | 100 MBits/s | 1-2xSTS-1 (50 MBits/s–100 MBits/s) |
| STM-4 (622 MBits/s) | 1 GBits/s | VC4-Nc (155 MBits/s–1.2 GBits/s) N = 1–8 |
| OC-12 (622 MBits/s) | 1 GBits/s | STS-Nc (155 MBits/s–1.2 Gbits/s) N = 3, 6, 9, 12, 15, 18, 21, 24 |

Prior art telecoms interfaces which can be purchased for carrying frame based data over a wide area network operate a 2 MBits/s (E1), 34 MBits/s (E3), 155 MBits/s (STM-1) or 622 MBits/s (STM-4). These data rates are not well matched to the prior art Ethernet data rates of 10 MBits/s, 100 MBits/s and 1 GBits/s. On the other hand, the prior art Ethernet data rates are well matched to multiples of the synchronous digital hierarchy virtual container payload data rates, as illustrated in Table 1. The SDH payload data rates have a granularity of a minimum incremental step of 2 MBits/s. A minimum granularity of Ethernet rates is 10 MBits/s, and so 5 SDH VC12 containers can accommodate neatly a single 10 MBits/s Ethernet channel.

A further feature of the specific embodiments and methods described herein is the provision of quality of service. By using the Ethernet IEEE 802.1 P/Q priority field, different packets can be given different priorities for transmission. Thus, quality of service levels which are achievable in prior art local area networks, may be extended over greater geographical distances carried over a synchronous digital hierarchy transport network as provided by the specific embodiments and methods of the present invention.

What is claimed is:

1. A synchronous digital multiplexer comprising:
   a plurality of telecoms tributary interfaces;
   a frame based data channel interface; and
   a synchronous digital channel port arranged to adapt data frames provided in accordance with a first frame based data communications protocol and received at a first rate to a second rate differing from the first data rate, the second data rate enabling the data frames to be multiplexed onto at least one synchronous network virtual container without encapsulating the data-frames provided in accordance with said first protocol within ATM cells prior to multiplexing onto at least one synchronous network virtual container.

2. The synchronous multiplexer as claimed in claim 1, wherein said frame based channel interface comprises:
   a frame based data channel physical port;
   a frame based data channel switch communicating with said frame based data channel physical port;
   a rate adaptor for converting data at a frame based data channel rate into a bit-stream of a data rate capable of being carried in at least one virtual container; and
   a synchronous digital network payload mapper for mapping said bit-stream into said at least one virtual container.

3. A synchronous multiplexer as claimed in claim 1, wherein said synchronous multiplexer is selected from the group consisting of:
   a synchronous digital hierarchy multiplexer, a SONET multiplexer, an add-drop multiplexer, and a terminal multiplexer.

4. An synchronous multiplexer as claimed in claim 1, wherein the synchronous digital network payload is a payload taken from the group including: VC-12, VC-3, VC-4.

5. A synchronous multiplexer as claimed in claim 1, wherein the multiplexer includes:
   an physical port communicating with a frame switch providing OSI-layer 2 data frames;
   a rate adaptation means for adapting between an first data rate and at least one synchronous digital network virtual container data rate; and
   a synchronous digital network payload mapper for mapping an adapted rate OSI-layer 2 data frame into one or more synchronous digital network payloads,
   wherein the rate adaptation means comprises a plurality of channels, each channel adapting an OSI-layer 2 data frame into at least one bit stream, wherein each bit stream has a data rate equivalent to the rate of a synchronous digital network virtual container, and wherein said rate adaptation means further comprises a buffer store for storing said OSI-layer 2 data frames until they can be multiplexed into said one or more synchronous digital payloads, and wherein said rate adaptation means initiates flow control by sending signals back to said frame switch to delay sending a further OSI-layer 2 data frame until said buffer store has sufficient capacity to accept a new data frame.

6. A synchronous multiplexer as claimed in claim 1, wherein said first frame based data communications protocol is selected from the group consisting of:
   an ISO-layer 2 protocol, an IEEE standard 802.3 CSMA/CD local area network system protocol, an Ethernet system protocol, a token ring system protocol, a token bus system protocol, a fiber distributed data interface system protocol, and a dual queue dual bus system protocol.

7. A synchronous digital multiplexer arranged to communicate OSI-layer 2 frame based data over a synchronous digital network comprising:
   a rate adaptor arranged to adapt said OSI-Layer 2 frame data by adapting an OSI-layer 2 data frame to at least one bit stream, each bit stream having a data rate which can be multiplexed into a synchronous digital network virtual container;
   a component arranged to provide at least one synchronous digital network virtual container having a data rate which is compatible with said at least one bit stream data rate formed by adapted OSI-layer 2 frame based data; and
   a component arranged to input said bit stream into said at least one synchronous digital network virtual container;
   wherein said OSI-layer 2 data frame is received by said network device at a higher rate then the rate at which said at least one bit stream is input into said at least one synchronous digital network virtual container, and
   wherein the rate at which the OSI-layer 2 data frames are received by said network device is controlled by sending signals back to said OSI-layer 2 frame switch to delay sending a further OSI-layer 2 frame until sufficient storage capacity is available for said rate adaptor to accept new OSI-layer 2 data frames for rate adaptation.

8. A multiplexer as claimed in claim 7, wherein the OSI-layer 2 frame based data is received from an OSI-layer 2 frame switch.

9. A multiplexer as claimed in claim 7, wherein the OSI-layer 2 data frame is provided in accordance with a frame based data communications protocol selected from the group consisting of:
an IEEE standard 802.3 CSMA/CD local area network system protocol, an Ethernet system protocol, a token ring system protocol, a token bus system protocol, a fiber distributed data interface system protocol, and a dual queue dual bus system protocol.

10. A multiplexer as claimed in claim 7, wherein said component providing at least one synchronous digital network virtual container concatenates a plurality of said virtual containers together to provide a synchronous digital network data rate which is compatible with the data rate of said Ethernet data; and wherein the component inputting said bit stream comprising said Ethernet frame based data into at least one synchronous digital network virtual container inputs said Ethernet frame based data into said plurality of concatenated virtual containers.

11. A synchronous digital multiplexer arranged to create a frame based data channel within a synchronous digital channel, wherein said frame based data is provided at a first rate, the device comprising:
a rate adaptor arranged to modify said first data rate of said frame based data outside said synchronous digital channel to a second rate compatible with said synchronous digital channel; and
a mapper arranged to mapping said rate adapted frame based data directly to said synchronous digital channel by mapping said modified frame based data into a plurality of virtual containers,
wherein said first rate at which said frame based data is provided to said network device is faster than said second rate at which data frames containing said frame based data are input into said virtual containers.

12. A rate adaptor arranged to form part of a synchronous digital multiplexer in a data communications network, the network including a plurality of frame based data switch, the rate adaptor comprising:
a component arranged to communicate with at least one of said plurality of frame based data switches;
a component arranged to receive frame based data from said at least one frame, based data switch,
a component arranged to adapt a data rate of said frame based data to a synchronous digital data rate of at least one synchronous digital channel, the adaptation including adapting a data frame comprising said frame based data into at least one bit stream, wherein each bit stream has a data rate equivalent to the rate of a synchronous digital network virtual container; and
a plurality of mapping means for mapping said rate adapted frame based data into at least one synchronous digital channel,
at least one buffer store for storing at least one frame of said frame based data prior to mapping said rate adapted frame based data into said synchronous digital channel; and
a flow control component arranged to initiate flow control by sending signals back to said at least one frame based data switch to delay sending a data frame until at least one buffer store of said rate adaptation means has sufficient capacity to accept at least one more data frame.

13. A rate adaptor as claimed in claim 12, wherein a data frame is provided in accordance with a frame based data communications protocol selected from the group consisting of:
an IEEE standard 802.3 CSMA/CD local area network system protocol, an Ethernet system protocol, a token ring system protocol, a token bus system protocol, a fiber distributed data interface system protocol, and a dual queue dual bus system protocol.

14. An OSI-layer 2 port card comprising:
an OSI-layer 2 physical port communicating with an OSI-layer 2 frame switch;
a rate adaptor arranged to adapt between an OSI-layer 2 data rate and at least one synchronous digital network virtual container data rate; and
a synchronous digital network payload mapper for mapping rate an adapted OSI-layer 2 frame into one or more synchronous digital network payloads,
wherein the rate adaptor comprises:
plurality of channels, each channel adapting an OSI-layer 2 data frame into at least one bit stream, wherein each bit stream has a data rate equivalent to the rate of a synchronous digital network virtual container;
a buffer store for storing said OSI-layer 2 data frames until they can be multiplexed into said one or more synchronous digital payloads, and
flow control means arranged to initiate flow control by sending signals back to said OSI-layer 2 frame switch to delay sending a further OSI-layer 2 frame until said buffer store has sufficient capacity to accept a new OSI-layer 2 data frame.

15. An OSI-layer 2 port card as claimed in claim 14, wherein the port card is incorporated into a synchronous digital multiplexer.

16. A method of communicating OSI-layer 2 frame based data over a synchronous digital network using a synchronous digital multiplexer, the method comprising the steps of:
rate adapting said OSI-layer 2 frame based data by adapting an OSI-layer 2 data frame to at least one bit stream, each bit stream having a data rate which can be multiplexed into a synchronous digital network virtual container by the synchronous digital multiplexer;
providing at least one synchronous digital network virtual container having a data rate which is compatible with said at least one bit stream data rate formed by adapted OSI-layer 2 frame based data; and
inputting said at least one bit stream into at least one synchronous digital network virtual container;
wherein said OSI-layer 2 data frame received at a higher rate than the rate at which said at least one bit stream is input into said at least one synchronous digital network virtual container, and
wherein the OSI-layer 2 frame based data is received from an OSI-layer 2 frame switch, and
wherein the rate at which the OSI-layer 2 data frames are received is controlled by sending signals back to said OSI-layer 2 frame switch to do delay sending a further OSI-layer 2 frame until sufficient storage capacity is available to accept said further OSI-layer 2 data frame for said step of rate adaptation.

17. A frame based data communication network comprising:
a plurality of computer devices each having a frame based data channel interface;
a plurality of synchronous multiplexers connected by a synchronous digital transport network, each synchronous multiplexer comprising a plurality of telecoms tributary interfaces; a frame based data channel interface; and a synchronous digital channel port arranged to adapt data frames received by the multiplexer in accordance with a first OSI-layer 2 protocol at a first rate to a second rate differing from the first data rate, the second data rate enabling the data frames to be multiplexed onto at least one synchronous network virtual container without encapsulating the data-frames within ATM cells prior to multiplexing onto at least one synchronous network virtual container;

wherein said plurality of computing devices communicate with each other over a plurality of frame based data channels carried over said synchronous digital transport network connecting said plurality of synchronous multiplexers.

18. A frame based communications network as claimed in claim 17, wherein a said frame based data channel interface comprises:

means for mapping a data frame or said frame based data channel to at least one payload of said synchronous network protocol.

19. A frame based communications network as claimed in claim 17, wherein said synchronous digital transport network comprises a synchronous optical network (SONET).

20. A data communications network comprising a plurality of network devices each comprising:

a frame switching device providing data frames at a first rate;

a rate adaptation device for adapting frames received at said first data rate to a second data rate between said first data rate and a synchronous transmission data rate, the rate adaptation device comprising a plurality of channels, and arranged to adapt a data frame into at least one bit stream, wherein each bit stream has a data rate equivalent to the rate of a synchronous digital network virtual container; and a mapping device for mapping said rate adapted data between said frame switching device and a synchronous digital channel;

wherein said plurality of mapping devices communicate over said synchronous digital channel; and wherein said plurality of frame switching devices communicate over an OSI-layer 2 channel carried on said synchronous digital channel.

21. The network as claimed in claim 20, wherein said OSI-layer 2 channel comprises a ring channel linking said plurality of network devices.

22. The network as claimed in claim 21, wherein said OSI-layer 2 channel comprises a plurality of point to point channels linking pairs of individual said frame switching devices.

23. The network as claimed in claim 21, wherein at least one of said plurality of network devices comprises synchronous digital multiplexer.

24. A communications network comprising:

a plurality of network devices each comprising: a rate means for adapting a data rate between an OSI-layer 2 data rate and synchronous transmission data rate, the rate adaptation device comprising a plurality of channels and arranged to adapt an OSI-layer 2 data frame into at least one bit stream, wherein each bit stream has a data rate equivalent to the rate of a synchronous digital network virtual container, and a mapping device for mapping data between an OSI-layer 2 channel and a synchronous digital channel;

wherein said plurality of mapping means communicate over said synchronous digital channel; and said plurality of rate adaptation means communicate over said OSI-layer 2 channel carried on said synchronous digital channel.

25. The network as claimed in claim 24, wherein at least one of said plurality of network devices comprises a synchronous digital multiplexer.

26. A communications network comprising:

a plurality of rate adaptors arranged to adapt OSI-layer 2 frame based data packets to a rate suitable for transport over a synchronous digital channel:

a plurality of mapping means, said plurality of mapping means communicating with said plurality of rate adaptation means, for transfer of OSI-layer 2 frame based data between said mapping means and said rate adaptation means;

wherein each said rate adaptation means comprises a plurality of channels and is arranged to adapt an OSI-layer 2 data frame into at least one bit stream, wherein each bit stream has a data rate equivalent to the rate of a synchronous digital network virtual container, and wherein said plurality of rate adaptation means are interconnected to form at least one OSI-layer 2 frame based data channel carried over synchronous digital channel connected between said plurality of mapping means.

27. The communications network as claimed in claim 26, wherein said plurality of mapping means are connected by a synchronous digital network ring.

28. The communications network as claimed in claim 26, wherein said OSI-layer 2 frame based data channel is connected in a ring structure between said plurality of rate adaptation means.

29. The communications network as claimed in claim 26, wherein each said rate adaptation means further comprises:

at least one buffer store for storing said OSI-layer 2 frame based data packets prior to mapping said rate adapted data into said synchronous digital channel; and flow control means to initiate flow control by sending signals back to an OSI-layer 2 switch source of said OSI-Layer 2 frame based data such that said OSI-Layer 2 switch source delays sending a further Ethernet frame until at least one buffer store of said rate adaptation means has sufficient capacity to accept new OSI-Layer 2 data frames.

30. A rate adaptor as claimed in claim 26, wherein the rate adaptor is arranged to form part of a synchronous digital multiplexer.

* * * * *